(12) United States Patent
Fujii et al.

(10) Patent No.: US 7,911,989 B2
(45) Date of Patent: *Mar. 22, 2011

(54) INFORMATION PROCESSING SYSTEM, INFORMATION PROCESSING UNIT, CONTROL METHOD, PROGRAM AND A RECORDING MEDIUM

(75) Inventors: Kazuo Fujii, Kanagawa (JP); Masaharu Itoh, Kanagawa (JP); Kozo Matusnaga, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 240 days.

This patent is subject to a terminal disclaimer.

(21) Appl. No.: 12/201,572

(22) Filed: Aug. 29, 2008

(65) Prior Publication Data

US 2009/0002759 A1    Jan. 1, 2009

Related U.S. Application Data

(63) Continuation of application No. 11/190,305, filed on Jul. 26, 2005, now Pat. No. 7,453,859.

(30) Foreign Application Priority Data

Jul. 26, 2004    (JP) .................... 2004-217604

(51) Int. Cl.
    *H04M 1/00*    (2006.01)
(52) U.S. Cl. ............... 370/310.2; 370/328; 370/338
(58) Field of Classification Search .......... 370/338, 370/310.2, 328, 335, 310, 238, 322, 324, 370/329, 341, 350, 318
    See application file for complete search history.

(56) References Cited

U.S. PATENT DOCUMENTS

| | | | |
|---|---|---|---|
| 5,553,083 A | 9/1996 | Miller | 714/748 |
| 5,745,483 A | 4/1998 | Nakagawa et al. | 370/335 |
| 6,859,831 B1 | 2/2005 | Gelvin et al. | 709/224 |

(Continued)

FOREIGN PATENT DOCUMENTS

JP    08-097827    4/1996

(Continued)

OTHER PUBLICATIONS

"Part 11: Wireless LAN Medium Access Control (MAC) and Physical Layer (PHY) specifications—High-speed Physical Layer in the 5 GHz Band", IEEE-SA Standards Board, IEEE Std 802.11a-1999 (R2003), Jun. 12, 2003, 91 pages.

(Continued)

*Primary Examiner* — Jean A Gelin
(74) *Attorney, Agent, or Firm* — Harrington & Smith

(57) ABSTRACT

An information processing system includes a plurality of information processing units wirelessly communicating with each other, each of which includes a distribution data receiving section for receiving distribution data to be distributed to each of the information processing units from an information processing unit that has received the distribution data among the plurality of information processing units, a destination selection section for selecting an information processing unit that has not received the distribution data as a destination information processing unit for the distribution data from among the plurality of information processing units, and a distribution data sending section for sending the distribution data to the information processing unit selected by the destination selection section using a frequency band that is not used by another information processing unit while the other information processing unit is sending the distribution data to still another information processing unit.

18 Claims, 15 Drawing Sheets

U.S. PATENT DOCUMENTS

| | | | |
|---|---|---|---|
| 7,376,583 B1 * | 5/2008 | Rolf | 705/17 |
| 7,453,859 B2 * | 11/2008 | Fujii et al. | 370/338 |
| 2004/0114521 A1 | 6/2004 | Sugaya | 370/238 |
| 2004/0180702 A1 | 9/2004 | Hughes | 455/574 |
| 2005/0047383 A1 | 3/2005 | Yoshida | 370/338 |
| 2005/0078610 A1 | 4/2005 | Previdi et al. | 370/254 |
| 2005/0190796 A1 | 9/2005 | Date et al. | 370/503 |
| 2005/0286458 A1 | 12/2005 | Furukawa et al. | 370/315 |

FOREIGN PATENT DOCUMENTS

| | | |
|---|---|---|
| JP | 11-055259 | 2/1999 |
| JP | 2001-339399 | 7/2001 |
| JP | 200302263 A | 1/2003 |
| JP | 2004-164566 | 6/2004 |

OTHER PUBLICATIONS

"Part 11: Wireless LAN Medium Access Control (MAC) and Physical Layer (PHY) specifications—Amendment 4: Further Higher Data Rate Extension in the 2.4 GHz Band", IEEE Std 802.11g-2003, Jun. 27, 2003, 12 pages.

"Part 11: Wireless LAN Medium Access Control (MAC) and Physical Layer (PHY) specifications—Amendment 2: Higher-speed Physical Layer (PHY) extension in the 2.4 GHz band-Corrigendum1", IEEE Std 802.11b-1999/Corr 1-2001, Nov. 7, 2001, 24 pages.

* cited by examiner

INFORMATION PROCESSING SYSTEM, INFORMATION PROCESSING UNIT, CONTROL METHOD, PROGRAM AND A RECORDING MEDIUM

CROSS REFERENCE

This patent application is a continuing application of U.S. application Ser. No. 11/190,305, filed Jul. 26, 2005 now U.S. Pat. No. 7,453,859, which claims priority to Japanese Patent Application Number 2004-217604 filed on Jul. 26, 2004, the disclosure of which is incorporated by reference in its entirety.

TECHNICAL FIELD

The present invention relates to an information processing system, information processing unit, control method, program and recording medium. In particular, the present invention relates to an information processing system, information processing unit, control method, program and recording medium for configuring a wireless communication network.

BACKGROUND

Recently, as higher performance and more price reduction of computers are increasingly realized, "IT" is rapidly progressed in various fields. For example, in the field of education, it is increasingly common that each student is provided with his/her own personal computer for use during lectures and practices. In order to give such lectures appropriately, it is necessary to appropriately set up software for a lot of personal computers for each lecture.

As functions of software are increasingly complicated, significant time and labor are often required to set up software for a number of computers. Accordingly, it is conceivable to distribute a disk image for replacing the contents of a hard disk drive to each computer via a network when the same software is installed according to the same settings. However, the data size of the disk image is generally very large.

FIG. 14 is a conceptual diagram showing that a disk image is distributed via a wired network. A server device 80 communicates with a layer 2 switching hub via the Gigabit Ethernet®, for example. The layer 2 switching hub communicates with each of personal computers 85-1 to 85-30 via the 100 Base-T Ethernet®. In this case, if the data size of the disk image is assumed to be 5 Gbytes, distribution of the disk image is completed in about one hour. Thus, with the progress of recent communication technology, the communication speed of wired connection has been increased, and in most cases, there is caused no problem in the communication speed in distributing a disk image.

FIG. 15 is a conceptual diagram showing that a disk image is distributed via a wireless network. A server device 90 connects to a wireless LAN access point which is in compliance with the IEEE802.11g standard. The wireless LAN access point communicates with each of personal computers 95-1 to 95-30 at a link rate up to 54 Mbps. However, the effective transfer rate is about 20 Mbps. In this case, since the transfer band of 20 Mbps is shared by the thirty computers, the transfer rate of one computer is about 0.7 Mbps. As a result, if the data size of the disk image is assumed to be 5 Gbytes, more than sixteen hours are required for distribution of the disk image.

There have been proposed various techniques relative to the ad hoc mode for wireless LAN. For example, there has been proposed a technique wherein, when one cluster is constituted by multiple communication devices mutually communicating with each other in the ad hoc mode for wireless LAN, a cluster head for managing the cluster is appropriately selected from among these information processing units (see Japanese Published Patent Application 2002-44003). There has also been proposed a technique wherein, in star connection where one parent machine and multiple child machines are connected in the ad hoc mode for wireless TAN a communication device to be the parent machine is selected based on the remaining amount of a battery for driving each communication device (see Japanese Published Patent Application 2003-32263).

According to the example in FIG. 14, it is possible to distribute a disk image at a high speed. However, it is necessary to perform wiring and install equipment in order to configure a wired network, which is often troublesome. According to the example in FIG. 15, it takes too much time to distribute a disk image. Therefore, even if distribution is started at a closing time, the distribution is not completed by a starting time of the next day. This causes the rate of facility operation to be very low. Further, since the techniques disclosed in the above patent applications aim at keeping the status of wireless communication in the ad hoc mode optimum, no method for distributing data, such as a disk image, at a high speed is mentioned.

SUMMARY OF THE PREFERRED EMBODIMENTS

The foregoing and other problems are overcome, and other advantages are realized, in accordance with the presently preferred embodiments of these teachings.

In order to solve the above problem, in a first aspect of the present invention, there is provided an information processing system comprising a plurality of information processing units wirelessly communicating with each other, in which each of the plurality of information processing units comprises a distribution data receiving section for receiving distribution data to be distributed by each of the plurality of information processing units from an information processing unit that has received the distribution data among the plurality of information processing units, a destination selection section for selecting an information processing unit that has not received the distribution data as a destination information processing unit for the distribution data from among the plurality of information processing units, and a distribution data sending section for sending the distribution data to the information processing unit selected by the destination selection section using a frequency band that is not used by another one of the plurality of information processing units while the other one of the plurality of information processing units is sending the distribution data to still another one of the plurality of information processing units. Further, an information processing unit configuring the information processing system, a control method for the information processing unit, a program for controlling the information processing unit, and a recording medium recording the program are also provided.

According to the present invention, data can be distributed to a plurality of information processing units at high speed.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
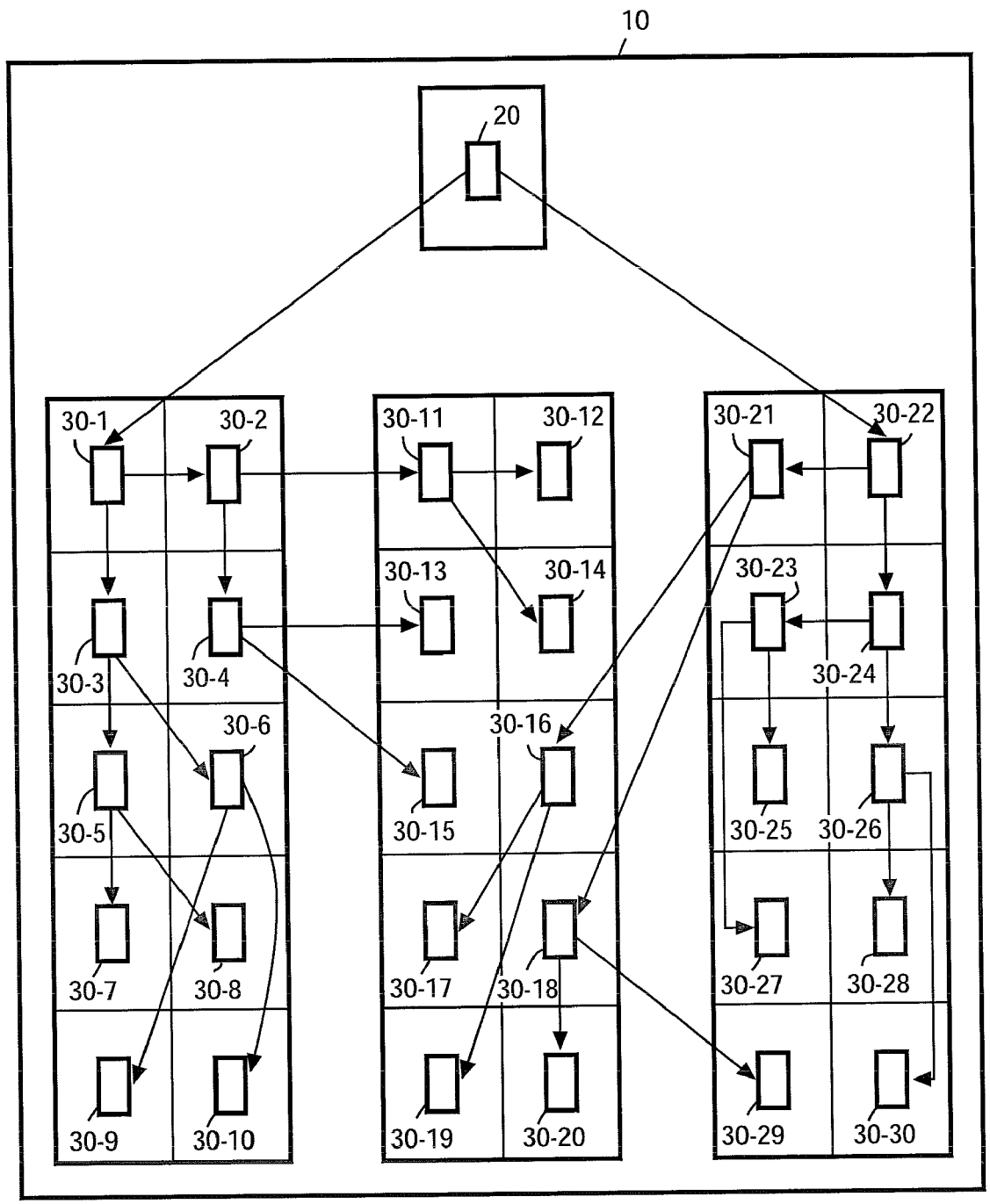
FIG. 1 shows a configuration of an information processing system.
Figure 2:
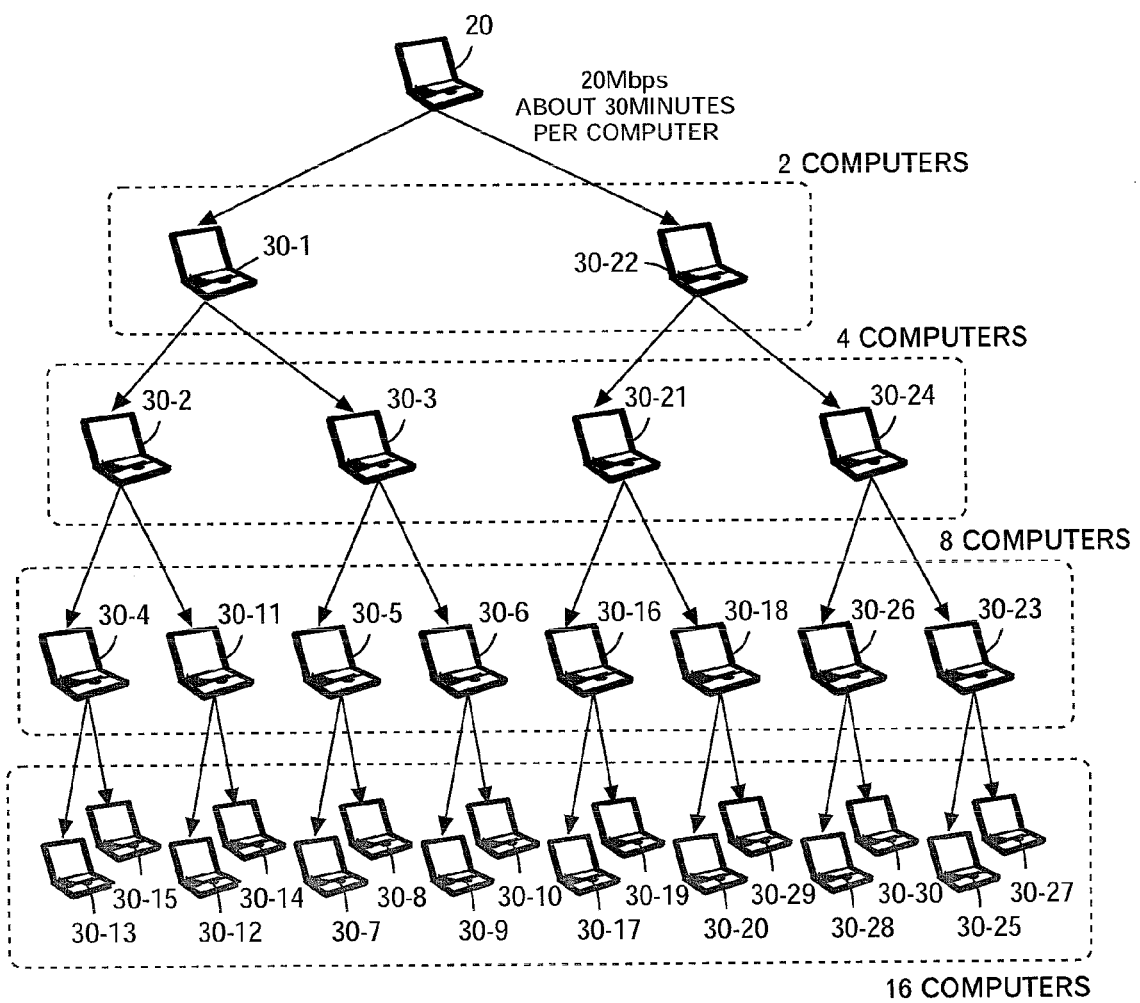
FIG. 2 shows transmission routes along which distribution data is sent in the information processing system.

FIG. 1 shows a configuration of an information processing system 10. FIG. 2 shows transmission routes along which distribution data is sent in the information processing system 10. The information processing system 10 is provided indoors, for example, in a lecture room and comprises an information processing unit 20 and information processing units 30-1 to 30-30 which wirelessly communicate with each other. The information processing unit 20 is provided, for example, on a lecture administrator's desk. The information processing unit 20 is a predetermined information processing unit serving as a source of distribution for distribution data to be distributed to the information processing units 30-1 to 30-30, and stores the distribution data in advance. For example, the information processing unit 20 may read the distribution data from a CD-ROM or the like and store it, in response to a user operation. The information processing unit 20 establishes one-to-one connection sequentially with each of the information processing units 30-1 and 30-22 in the wireless LAN ad hoc mode. Thereby, the information processing unit 20 sends the distribution data sequentially to each of the information processing units 30-1 and 30-22.

The information processing units 30-1 to 30-30 are provided, for example, on the respective student's desks. When receiving the distribution data, the information processing unit 30-1 sends the distribution data sequentially to each of the information processing units 30-2 and 30-3 using a frequency band which is not used by the information processing unit 20 for transmission while the information processing unit 20 is sending the distribution data to the information processing unit 30-22. Similarly, each of the information processing units 30-2 to 30-6, 30-11, 30-16, 30-18, 30-21 to 30-24 and 30-26 sends the distribution data using a frequency band which is not used by any other information processing unit while the other information processing unit is sending the distribution data to still another information processing unit.

The information processing unit may be a desktop type personal computer or a notebook type computer powered by a battery or by AC power. The wireless communication may be performed via a wireless LAN conforming to the IEEE802.11a/b/g standard, for example. The frequency band is determined by one of communication channels which can be selectively set in the wireless LAN standard. For example, in the case of the IEEE802.11a/g standard, one of twenty-seven channels can be set for each information processing unit, and a different frequency band can be used for each channel to be set.

The distribution data is, for example, a disk image for replacing the contents of the hard disk drive of each information processing unit. Specifically, the distribution data includes an operating system, application program(s), or setting information of parameters for these programs.

Thus, the information processing system 10 according to this embodiment sends distribution data concurrently using a plurality of frequency bands by combining a plurality of information processing units each of which can use only one frequency band. Thus, the distribution data can be distributed quickly by transferring it along, for example, communication routes in a tree structure to enhance the degree of concurrency in sending the distribution data, and using as many frequency bands as possible at the same time.

Figure 3:
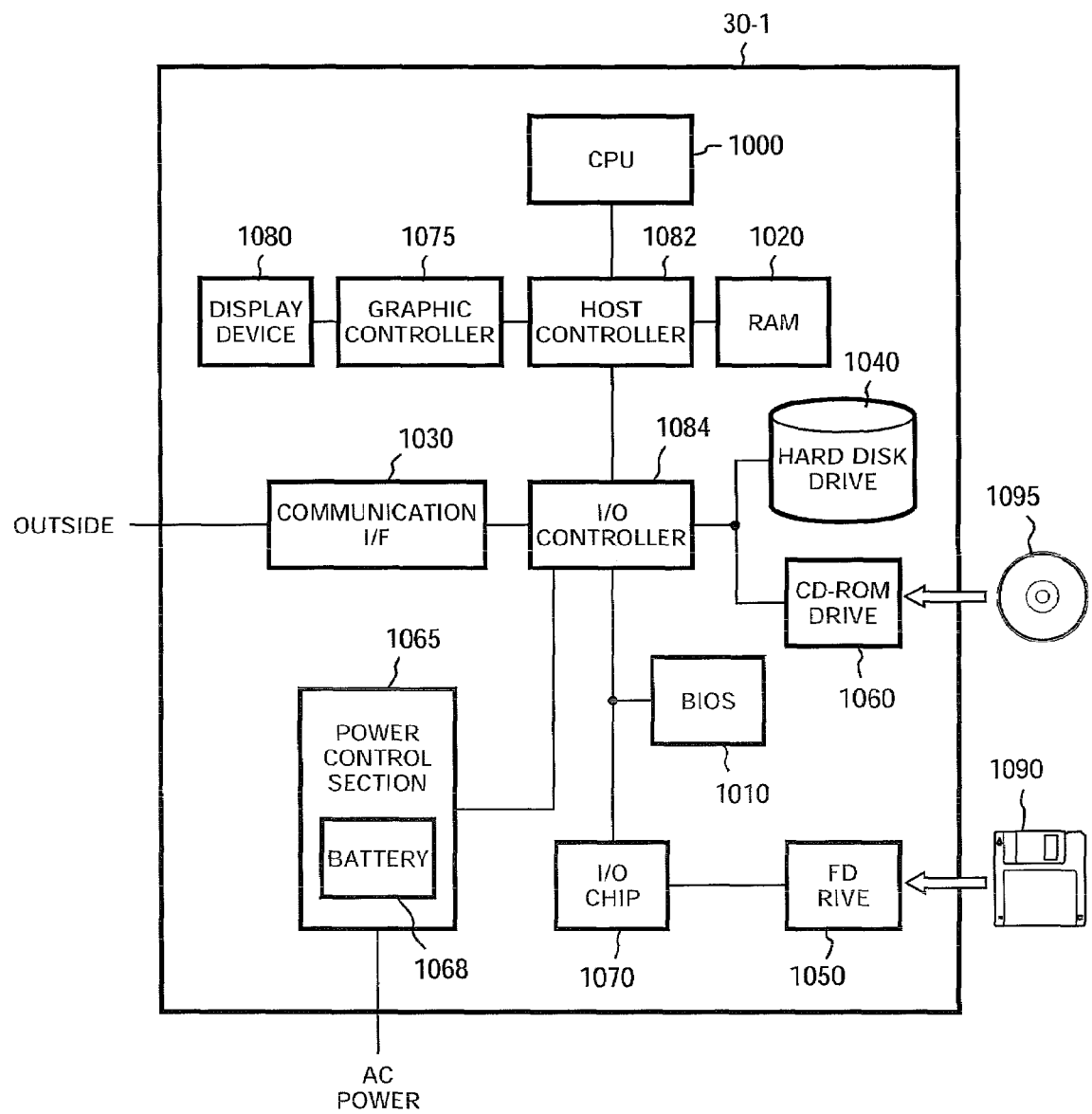
FIG. 3 shows a configuration of an information processing unit included in the information processing system.

FIG. 3 shows a configuration of the information processing unit 30-1. The information processing unit 30-1 is an example of a first information processing unit according to the present invention and comprises a CPU-related part having a CPU 1000, a RAM 1020 and a graphic controller 1075 which are mutually connected via a host controller 1082, an input/output part having a communication interface 1030, a hard disk drive 1040 and a CD-ROM drive 1060 which are connected to the host controller 1082 via an input/output controller 1084, and a legacy input/output part having a BIOS 1010, a flexible disk drive 1050 and an input/output chip 1070 which are connected to the input/output controller 1084.

The host controller 1082 connects the RAM 1020 to the CPU 1000 and the graphic controller 1075 both of which access the RAM 1020 at a high transfer rate. The CPU 1000 controls each part based on programs stored in the BIOS 1010 and the RAM 1020. The graphic controller 1075 acquires image data generated by the CPU 1000 or other device on a frame buffer provided in the RAM 1020, and displays it on a display device 1080. Alternatively, the graphic controller 1075 may include therein the frame buffer for storing image data generated by the CPU 1000 or other device.

The input/output controller 1084 connects the host controller 1082 to the communication interface 1030, the hard disk drive 1040 and the CD-ROM drive 1060 which are relatively high-speed input/output devices. The communication interface 1030 communicates with an external device via a wireless or wired network. Specifically, the communication interface 1030 may select one of frequency bands to communicate with another information processing unit.

The communication interface 1030 uses an ad hoc mode for performing one-to-one communication with another information processing unit, and an infrastructure mode for communicating with a wireless LAN access point. The hard disk drive 1040 stores programs and data to be used by the information processing unit 30-1. The CD-ROM drive 1060 reads a program or data from a CD-ROM 1095 and stores it in the RAM 1020 via the input/output controller 1084.

The BIOS 1010, a power control section 1065 and relatively low-speed input/output devices such as the input/output chip 1070 are connected to the input/output controller 1084. The BIOS 1010 stores a boot program to be executed by the CPU 10-0 at the startup time of the information processing unit 30-1, and programs dependent on the hardware of the information processing unit 30-1. The flexible disk drive 1050 is connected to the input/output chip 1070. The flexible disk drive 1050 reads a program or data from a flexible disk 1090 and stores it in the RAM 1020 via the input/output chip 1070 and the input/output controller 1084.

The power control section 1065 has a battery 1068 for driving the information processing unit 30-1. Also, the power control section 1065 is connected to an external AC power. The power control section 1065 supplies power to each part of the information processing unit 30-1 from the battery 1068 or the AC power. Furthermore, the power control section 1065 manages strength of the battery 1068 and outputs information indicating the battery strength to the CPU 1000. The power control section 1065 may power down the information processing unit 30-1 based on an instruction from the CPU 1000, or may shift the information processing unit 30-1 to a suspend state in which the power is temporarily shut down. The input/output chip 1070 connects the flexible disk 1090, and other input/output devices via parallel, serial, keyboard and/or mouse ports.

A program to be provided for the information processing unit 30-1 is stored in a recording medium such as the flexible disk 1090, the CD-ROM 1095 or an IC card, and provided by a user. The program is read from the recording medium via the input/output chip 1070 and/or the input/output controller 1084, installed in the information processing unit 30-1, and executed.

The program shown above may be stored in an external recording medium. The recording medium may be an optical recording medium such as a DVD or a PD, a magneto-optic recording medium such as an MD, a tape medium, or a semiconductor memory such as an IC card in addition to the flexible disk 1090 or the CD-ROM 1095. It is also possible to use a storage device, such as a hard disk drive or a RAM, which is provided for a server system connected to a dedicated communication network or the Internet as the recording medium, and provide the program to the information processing unit 30-1 via the network. Each of the information processing units 30-2 to 30-30 and the information processing unit 20 have almost the same configuration as the information processing unit 30-1, and therefore description thereof will be omitted here.

Figure 4:
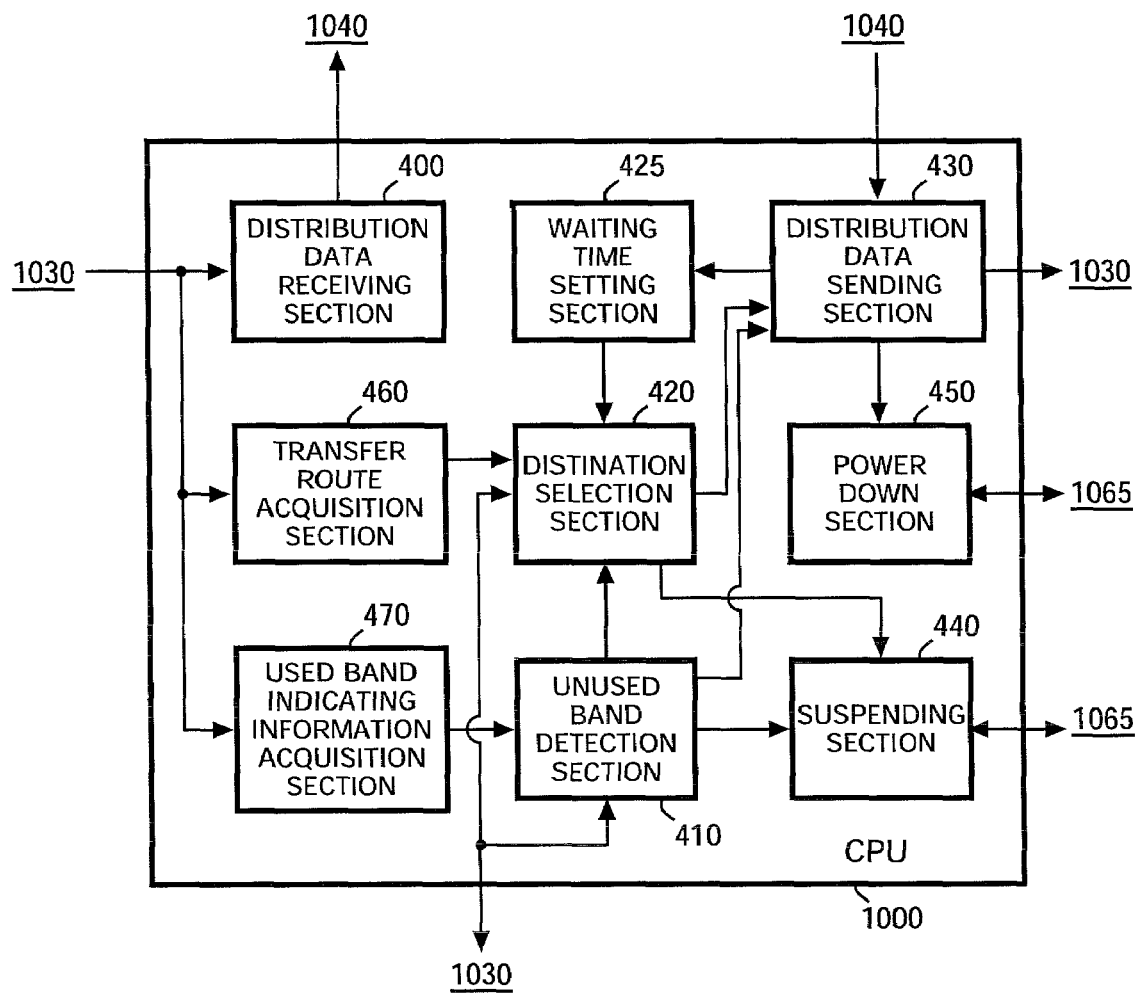
FIG. 4 shows a configuration of a CPU included in the information processing unit.

FIG. 4 shows a configuration of the CPU 1000. The program installed in the information processing unit 30-1 causes the CPU 1000 to function as a distribution data receiving section 400, an unused band detection section 410, a destination selection section 420, a waiting time setting section 425, a distribution data sending section 430, a suspending section 440, a power down section 450, a transfer route acquisition section 460 and a used band indicating information acquisition section 470. The distribution data receiving section 400 receives distribution data from an information processing unit that has received the distribution data among a plurality of information processing units, and stores it in the hard disk drive 1040. For example, the distribution data receiving section 400 may receive the distribution data from the information processing unit 20 which serves as a predetermined source of distribution, or receive the distribution data from another information processing unit which has received the distribution data from the information processing unit 20.

The unused band detection section 410 detects a frequency band which is not used by any other information processing unit within the range in which a radio wave of wireless communication by the information processing unit 30-1 interferes. For example, the unused band detection section 410 may periodically determine, for each frequency band, whether or not it is an unused band by giving an instruction to the communication interface 1030. More specifically, the unused band detection section 410 detects a wireless LAN communication channel which is not used by any other information processing unit for communication by switching wireless LAN communication channels to perform frequency hopping.

The destination selection section 420 selects from a plurality of information processing units an information processing unit which has not received the distribution data as an information processing unit to which the distribution data is to be sent. For example, the destination selection section 420 may instructs the communication interface 1030 to inquire of each of the other information processing units whether the distribution data has not been received, through an unused band. In this case, the destination selection section 420 selects an information processing unit from among information processing units which have made a response to the inquiry to the effect that the distribution data has not been received. Alternatively, the destination selection section 420 may select a destination information processing unit based on transfer route information acquired by the transfer route acquisition section 460. As a result, the destination selection section 420 selects, for example, the information processing unit 30-2, an example of a second information processing unit which has not received the distribution data, as a destination information processing unit to which the distribution data is to be sent.

Preferably, if the distribution data sending section 430 finishes transmission of the distribution data, the destination selection section 420 selects a destination information processing unit to which the distribution data sending section 430 sends the distribution data next, after passage of a waiting time set by the waiting time setting section 425. In this case, the waiting time setting section 425 may set the waiting time based on the time required for transmission of the distribution data acquired from the distribution data sending section 430. For example, a longer waiting time may be set if it takes much time to send the distribution data due to a bad radio wave condition. Thus, it is possible to assign a frequency band preferentially to an information processing unit having a good radio wave condition and, therefore, distribute the distribution data more efficiently.

The distribution data sending section 430 sends the distribution data to the information processing unit 30-2 selected by the destination selection section 420, using the unused band detected by the unused band detection section 410. Thus, the distribution data sending section 430 can send the distribution data concurrently with another information processing unit sending the distribution data to still another information processing unit, using a frequency band which is not used by that other information processing unit.

If the unused band detection section 410 cannot detect an unused band, the suspending section 440 instructs the power control section 1065 to temporarily power down the information processing unit 30-1 and shift the information processing unit 30-1 to a suspend state. More specifically, the suspending section 440 may call an API (Application Programming Interface) of the operating system or the BIOS to shift the information processing unit 30-1 to the suspend state. Furthermore, if an information processing unit which has not received the distribution data is not detected, the suspending section 440 may instruct the power control section 1065 to temporarily power down the information processing unit 30-1 and shift it to the suspend state.

If the distribution data has already been received, the power down section 450 acquires information about the strength or remaining charge of the battery 1068 from the power control section 1065 each time the distribution data is sent to another information processing unit. If the strength of the battery 1068 is below a level required for sending the distribution data, the power down section 450 powers down the information processing unit 30-1 without sending the distribution data to the next information processing unit.

The transfer route acquisition section 460 may acquire from the information processing unit 20 a transfer route along which the distribution data is to be transferred sequentially by a plurality of information processing units, in association with the distribution data. In this case, the destination selection section 420 selects a destination information processing unit based on the transfer route. For example, the transfer route acquisition section 460 may acquire a transfer route with the number of HOPs, which indicates the number of times the distribution data is transferred sequentially through a plurality of information processing units, being less than a predetermined upper-limit number and with the number of destination information processing units, to which the distribution data is sent by this information processing unit, being less than predetermined upper-limit number. Thereby, it is possible to determine an approximate upper limit of time required for sending the distribution data.

The used band indicating information acquisition section 470 may acquire used band indicating information specifying a frequency band used by each information processing unit for wireless communication, in association with the distribution data, for example. In this case, the unused band detection section 410 detects an unused band based on the used band indicating information. Accordingly, if frequency bands which do not interfere with each other are determined beforehand, it is possible to save time required for detecting an unused band. Thus, an unused band and a transfer route may be predetermined by the user.

A CPU in each of the information processing units 30-2 to 30-30 has almost the same configuration as that of the CPU 1000 shown in FIG. 4 except that the sender and the destination of the distribution data are different. For example, in the information processing unit 30-22, which is an example of a third information processing unit according to the present invention, the destination selection section 420 selects the information processing unit 30-21, which is an example of a fourth information processing unit according to the present invention, as a destination information processing unit. The distribution data sending section 430 sends the distribution data to the information processing unit 30-21 concurrently with the information processing unit 30-1 sending the distribution data to the information processing unit 30-2, using a frequency band which is not used by the information processing unit 30-1. The other parts of the configuration are almost the same as those of the CPU 1000 in FIG. 4, and therefore description thereof will be omitted.

Figure 5:
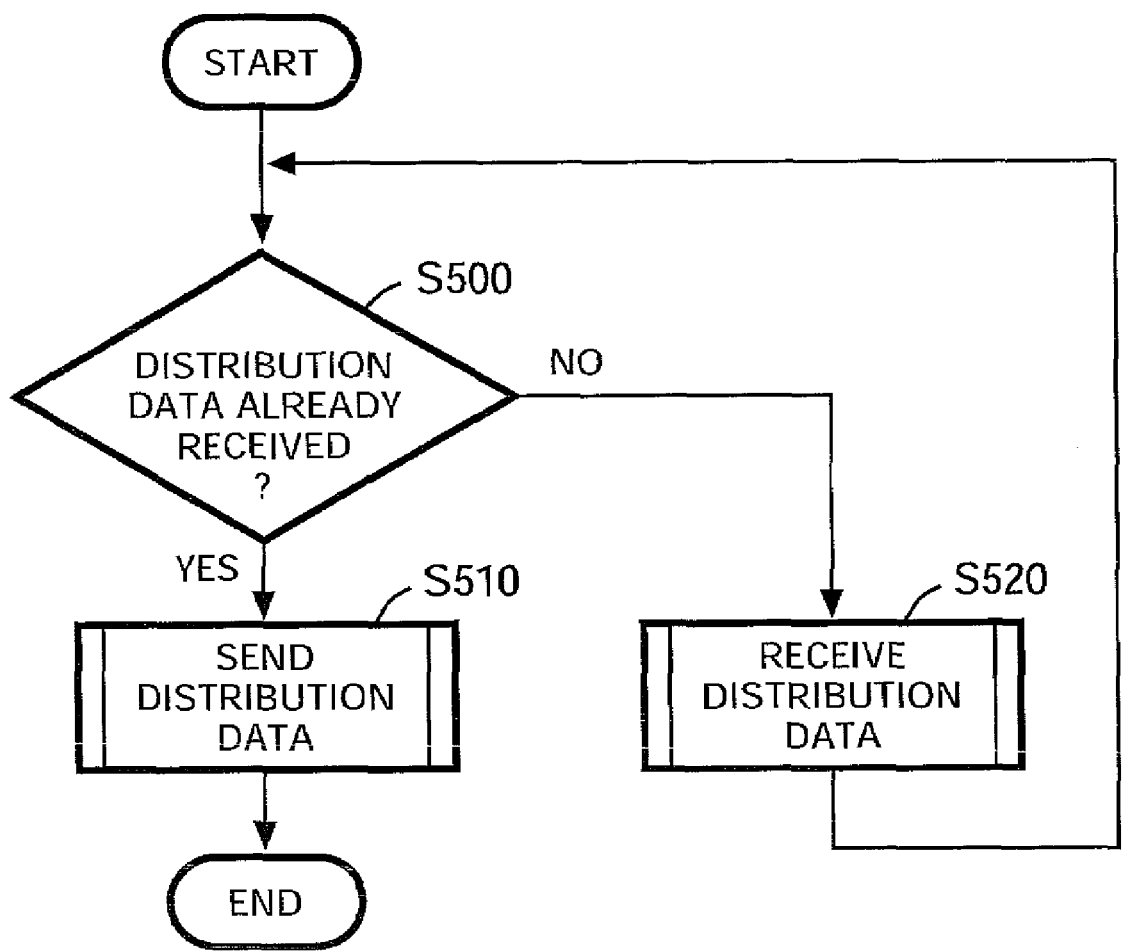
FIG. 5 shows a process flow of the information processing unit.

FIG. 5 shows a process flow of the information processing unit 30-1. If the information processing unit 30-1 has already received distribution data (S500: YES), it sends the distribution data to another information processing unit (S510). On the other hand, if the information processing unit 30-1 has not received the distribution data, it receives the distribution data from another information processing unit (S520).

Figure 6:
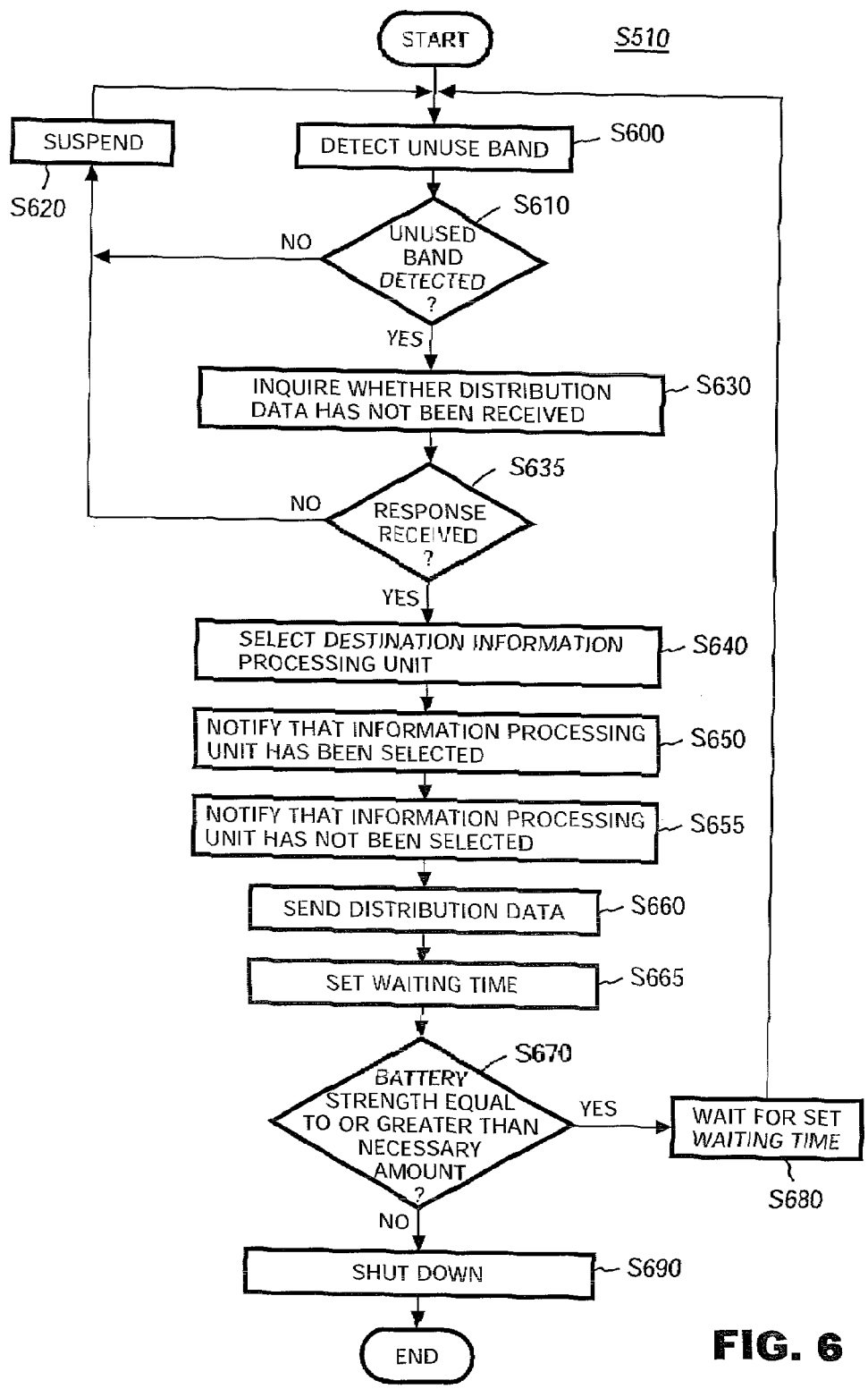
FIG. 6 shows a process flow of the information processing unit sending distribution data.

FIG. 6 shows a process flow of the information processing unit 30-1 sending distribution data. First, the unused band detection section 410 detects an unused band (S600). If an unused band cannot be detected (S610: NO), the suspending section 440 shifts the information processing unit 30-1 to a suspend state in which the information processing unit 30-1 is temporarily powered down (S620). Thereby, it is possible to reduce power consumption by the information processing unit 30-1 and suppress battery consumption. If the information processing unit 30-1 is driven by an AC power, the suspending section 440 may return the process to step S600 without shifting the information processing unit 30-1 to the suspend state. In this case, it is possible to check whether or not there is any unused band more frequently and, therefore, distribute the distribution data more quickly.

If an unused band is detected (S610: YES), then the destination selection section 420 inquires of each of the other information processing units whether the distribution data has not been received, using the unused band (S630). If the destination selection section 420 does not receive a response which indicates that the distribution data has not been received, from any of the information processing units (S635: NO), then the suspending section 440 shifts the information processing unit 30-1 to the suspend state in which the information processing unit 30-1 is temporarily powered down (S620).

On the other hand, if a response is received which indicates that the distribution data has not been received (S635: YES), then the destination selection section 420 selects a destination information processing unit to which the distribution data is to be sent (S640). If the response which indicates that the distribution data has not been received is received from a plurality of information processing units, then the destination selection section 420 preferably selects an information processing unit which communicates with the information processing unit 30-1 at the highest speed from among those information processing units.

For example, the destination selection section 420 may select an information processing unit having the highest wireless-LAN link speed. Alternatively, the destination selection section 420 may measure the effective speed between the information processing unit 30-1 and each of the other information processing units, and select an information processing unit having the highest effective speed. Alternatively, the destination selection section 420 may select an information processing unit which communicates via a wireless LAN conforming to the IEEE802.1a/g standard without selecting any information processing unit which communicates via a wireless LAN conforming to the IEEE802.11b standard. Accordingly, it is possible to assign a frequency band to higher-speed communication and distribute the distribution data efficiently.

The destination selection section 420 notifies the selected information processing unit that the information processing unit has been selected as the destination (S650). The destination selection section 420 also notifies each of the information processing units which have not been selected as the destination among the information processing units which have made the response, that the information processing unit has not been selected as the destination (S655). Thereby, the notified information processing unit can shift its process to receipt of the distribution data from another information processing unit. In this case, the destination selection section 420 preferably sends to each of the information processing units which have not been selected as the destination among the information processing units which have made the response, information about the total number of the information processing units which have made the response in association with the notification that the information processing unit has not been selected as the destination. Thereby, the information processing unit waiting to receive the distribution data can know the approximate number of information processing units which compete therewith to receive the distribution data.

The distribution data sending section 430 then sends the distribution data to the information processing unit selected by the destination selection section 420, using the unused band detected by the unused band detection section 410 (S660). When transmission of the distribution data ends, the waiting time setting section 425 sets a waiting time to wait before selecting a destination information processing unit to which the distribution data is to be sent next, based on the time required for sending the distribution data (S665).

If the distribution data sending section 430 sends the distribution data to another information processing unit at a higher communication speed, then the waiting time setting section 425 preferably sets the waiting time shorter in comparison with the case where the communication speed is lower. Thereby, it is possible to assign a frequency band to an information processing unit having a higher communication speed preferentially and, therefore, distribute the distribution data more efficiently. As an another example, if the number of HOPs or the number of times the distribution data received by the distribution data receiving section 400 has been transferred sequentially by a plurality of information processing unit, is larger, then the waiting time setting section 425 sets the waiting time shorter in comparison with the case where the number of HOPs is smaller. Thereby, it is possible to distribute the distribution data to an information processing unit located farther from the source information processing unit preferentially to enhance efficiency of distributing the distribution data.

Then, the power down section 450 determines whether or not the strength or remaining charge of the battery 1068 is equal to or greater than the amount required for sending the distribution data (S670). For example, the power down section 450 may assume the battery strength capable of driving the information processing unit 30-1 for the time required for sending distribution data in the past to be the necessary amount. Alternatively, the power down section 450 may assume the battery strength capable of driving the information processing unit 30-1 for the time required for the distribution data receiving section 400 to receive the distribution data to be the necessary amount and determine whether or not the strength of the battery 1068 is equal to or greater than the necessary amount. Thereby, it is possible to predict the necessary amount at a certain level of accuracy even if the information processing unit has not sent the distribution data to another information processing unit.

If the battery strength is equal to or greater than the necessary amount (S670: YES), then the destination selection section 420 waits for the waiting time set by the waiting time setting section 425 (S680) and returns the process to step S600. On the other hand, if the strength of the battery 1068 is below the necessary amount (S670: NO), then the power down section 450 shuts down the information processing unit 30-1 (S690), and the information processing unit 30-1 finishes the process. Thus, it is possible to prevent the battery from being exhausted during transmission of distribution data.

Alternatively, the power down section 450 may power down or shut down the information processing unit 30-1 when the strength of the battery 1068 is below a predetermined reference amount for the transmission of distribution data. For example, the power down section 450 powers down the information processing unit 30-1 when the strength of the battery 1068 is below 80% of the full charge. As a result, it is possible to keep the battery strength of all the information processing units in the information processing system 10 at about 80% when distribution of distribution data ends. Thereby, it is possible to keep appropriate battery strength when the information processing system 10 is used again after the distribution data has been distributed.

Figure 7:
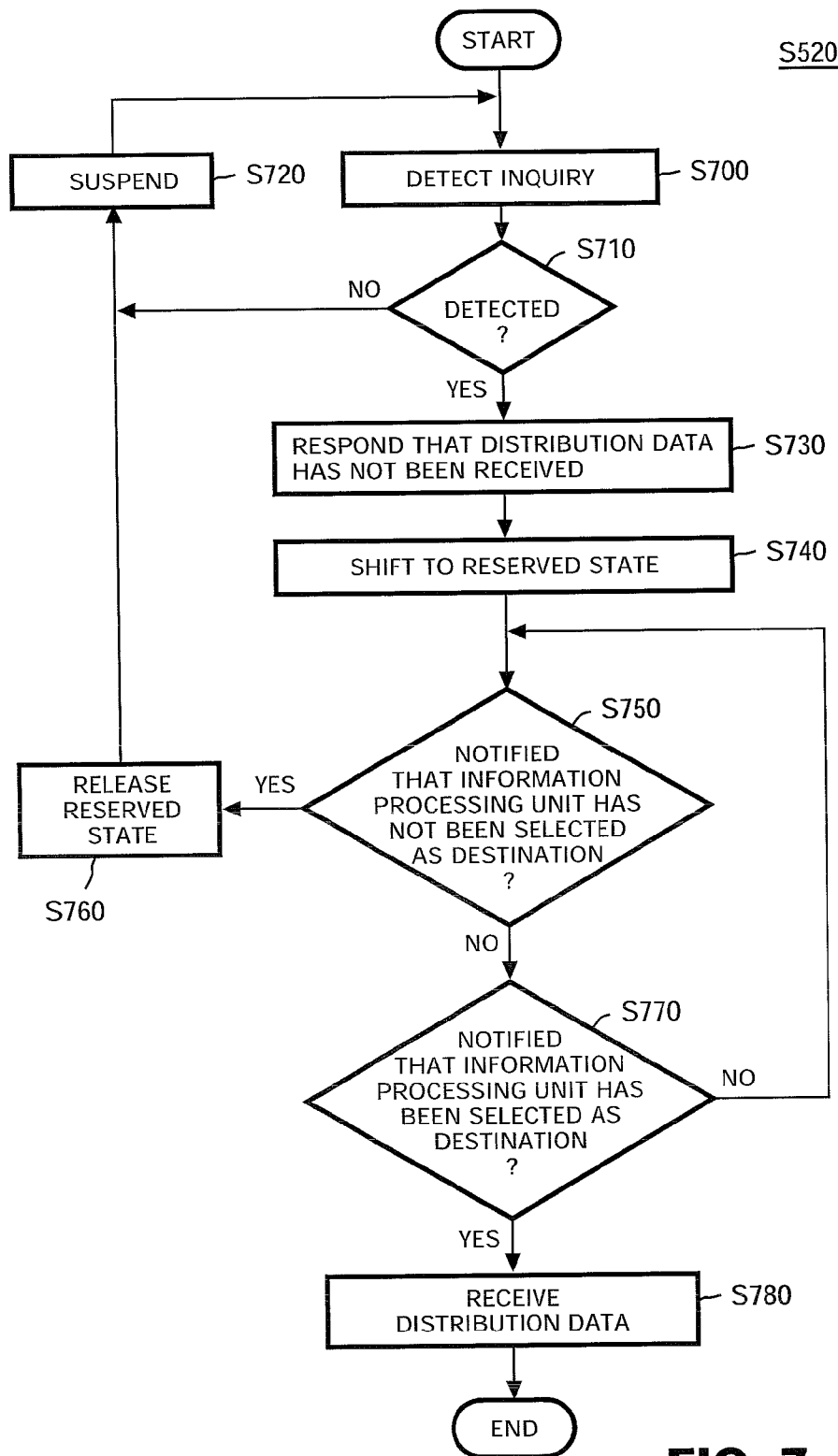
FIG. 7 shows a process flow of the information processing unit receiving distribution data.

FIG. 7 shows a process flow of the information processing unit 30-1 receiving distribution data. The distribution data receiving section 400 detects an inquiry about whether distribution data has not been received (S700). If such an inquiry is not detected (S710: NO), then the suspending section 440 may temporarily power down the information processing unit 30-1 to shift it to the suspend state (S720).

On the other hand, if such an inquiry is detected (S710: YES), then the distribution data receiving section 400 responds that it has not received distribution data (S730). The distribution data receiving section 400 then shifts to a reserved state in which it does not respond to an inquiry from any information processing unit other than the inquiring information processing unit that it has not received distribution data (S740).

Then, if the distribution data receiving section 400 is notified that the information processing unit 30-1 has not been selected as a destination (S750: YES), the distribution data receiving section 400 releases the reserved state (S760). The distribution data receiving section 400 may receive information about the total number of information processing units which have responded to the inquiry that distribution data has not been received, in association with the notification that the information processing unit 30-1 has not been selected as a destination. In this case, the suspending section 440 preferably powers down the information processing unit 30-1 temporarily for a longer time when the total number of responding information processing units is larger, in comparison with the case where the total number of responding information processing units is smaller (S720). Thereby, it is possible to reduce power consumption wasted by waiting to receive distribution data when there are a lot of information processing units competing to receive the distribution data.

On the other hand, if the distribution data receiving section 400 is not notified that the information processing unit 30-1 has not been selected as a destination (S750: NO), then it determines whether or not it is notified that the information processing unit 30-1 has been selected as a destination (S770). If the distribution data receiving section 400 is not notified that the information processing unit 30-1 has been selected as a destination (S770: NO), then it returns the process to step S750. If the distribution data receiving section 400 is notified that the information processing unit 30-1 has been selected as a destination (S770: YES), then it starts to receive the distribution data (S780).

The process of sending distribution data to each information processing unit as time passes will be described with reference to FIGS. 8 to 13. In FIGS. 8 to 13, the distribution data is assumed to be sent and received via a wireless LAN conforming to the IEEE802.11a/g standard. Therefore, bands available for one communication are twenty-seven predetermined channels among channels 1 to 165. In the figures, these channels are indicated at the horizontal axis. The vertical axis of the figures indicates a lapse of time, and one space between horizontal solid lines indicates a lapse of one hour. It is assumed here that transmission of distribution data requires thirty minutes.

Figure 8:
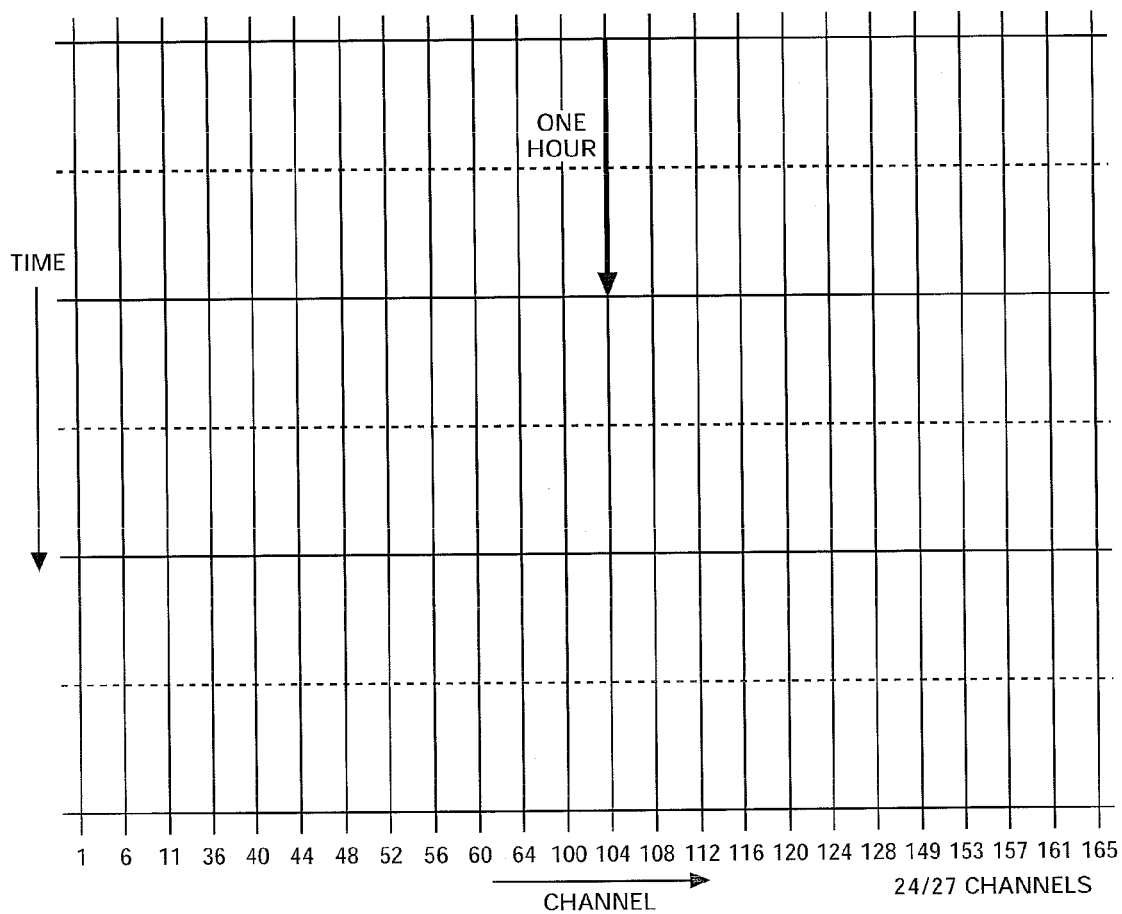
FIG. 8 shows a process of sending the distribution data via wireless communication in thirty minutes from the beginning.
Figure 9:
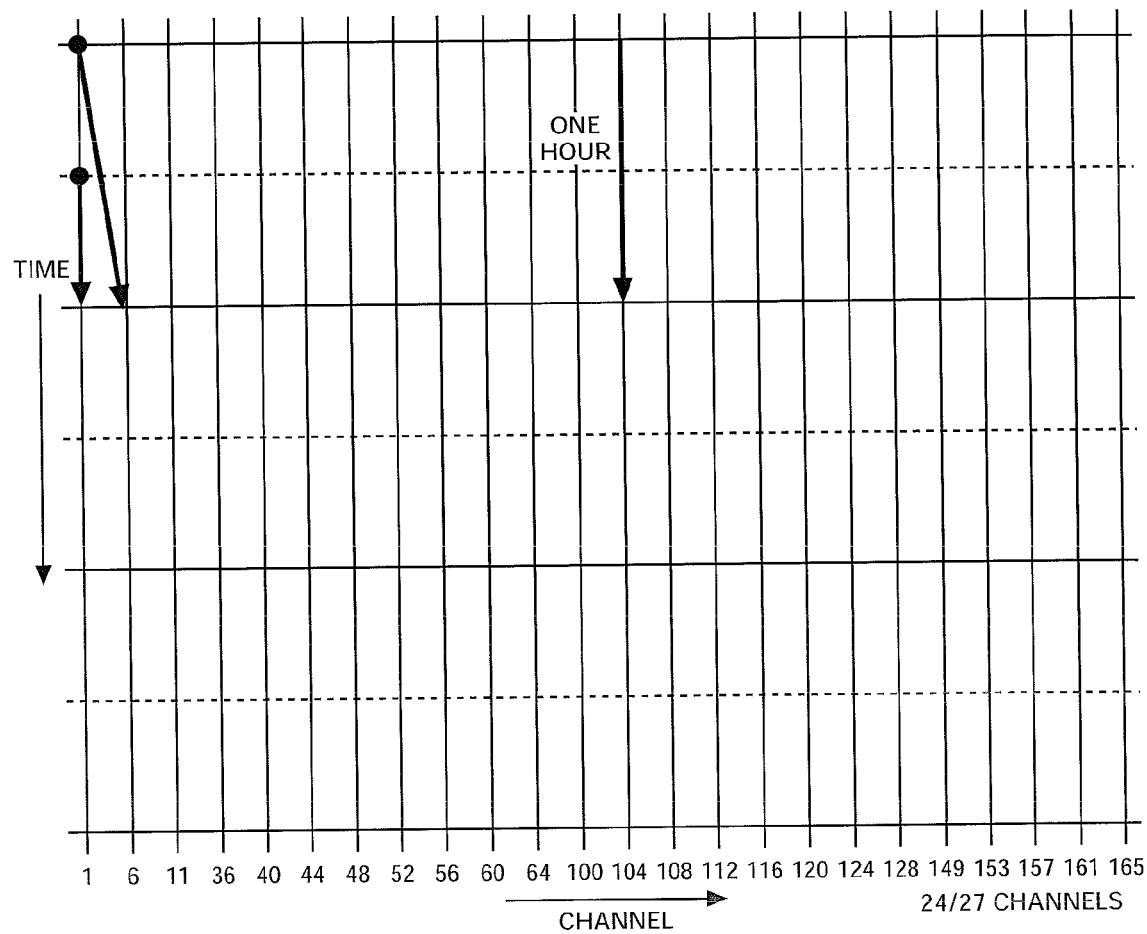
FIG. 9 shows a process of sending the distribution data via wireless communication in one hour from the beginning.

FIG. 8 shows a process of sending distribution data via wireless communication in thirty minutes from the beginning. A source information processing unit sends distribution data to another information processing unit using the channel 1. FIG. 9 shows a process of sending the distribution data via wireless communication in one hour from the beginning. Each of the source information processing unit and the information processing unit which has received the distribution data from the source information processing unit sends the distribution data to another information processing unit using the channel 1 and the channel 6 in the next thirty minutes, respectively.

Figure 10:
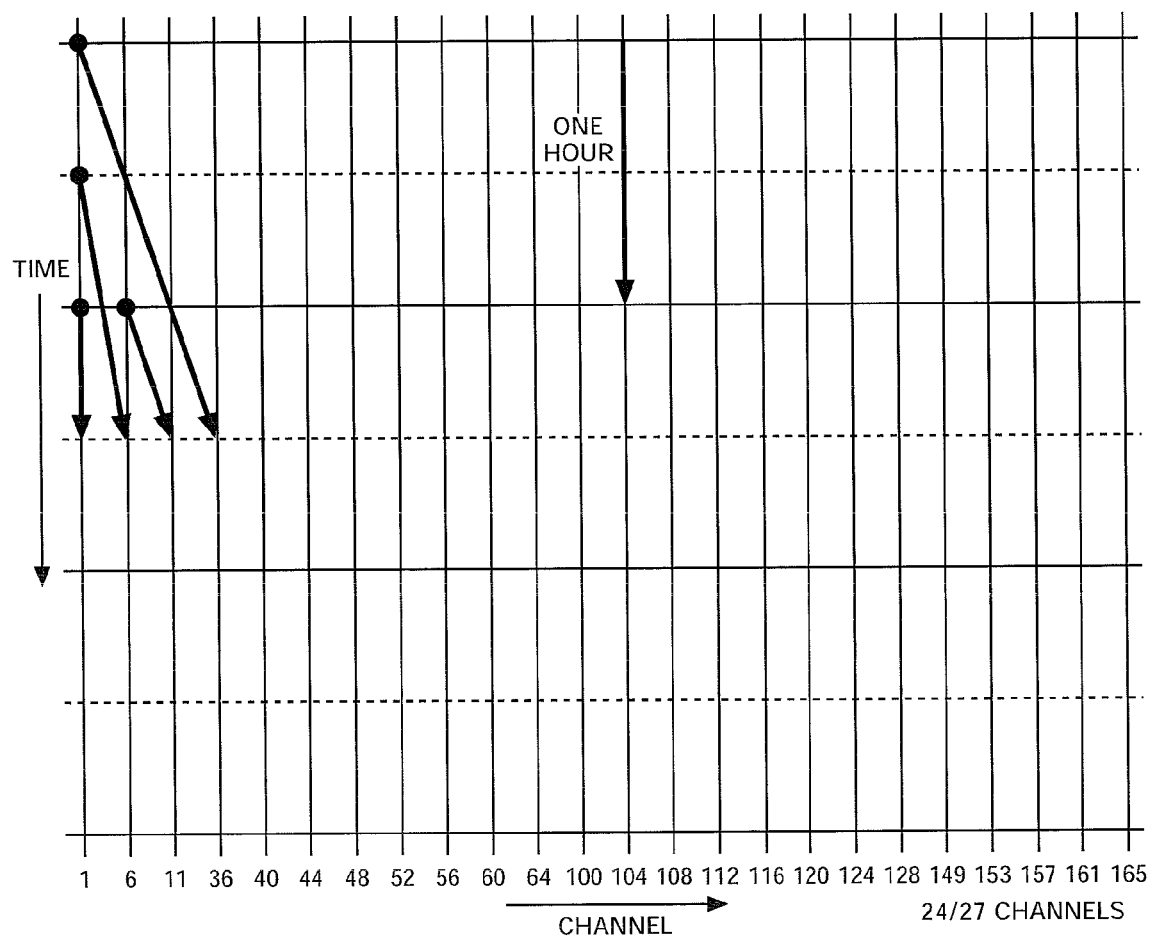
FIG. 10 shows a process of sending the distribution data via wireless communication in one hour and thirty minutes from the beginning.
Figure 11:
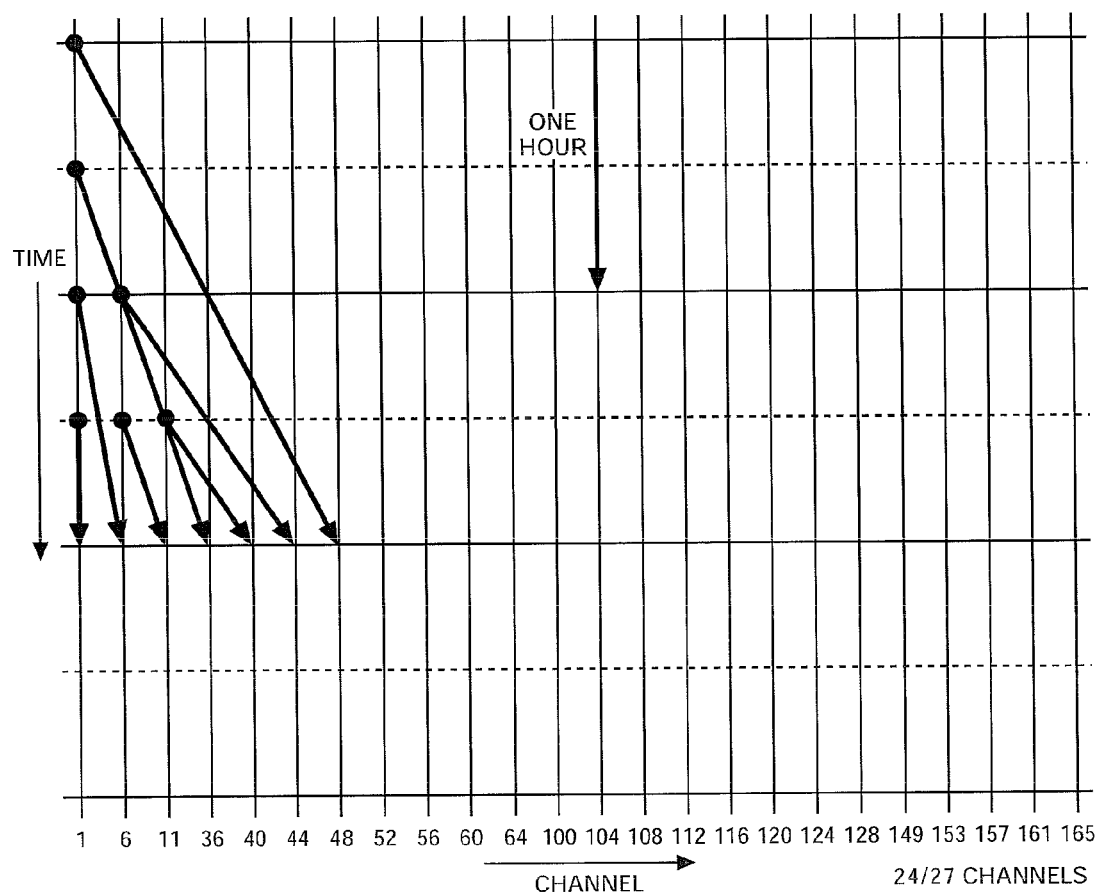
FIG. 11 shows a process of sending the distribution data via wireless communication in two hours from the beginning.

FIG. 10 shows a process of sending the distribution data via wireless communication in one hour and thirty minutes from the beginning. The information processing units which have received the distribution data in one hour from the beginning and the source information processing unit send the distribution data to other information processing units using the channels 1, 6, 11 and 36, respectively. FIG. 11 shows a process of sending the distribution data via wireless communication in two hours from the beginning. The information processing units which have received the distribution data in one hour and thirty minutes from the beginning and the source information processing unit send the distribution data to other information processing units using the channels 1, 6, 11, 36, 40, 44 and 48, respectively.

Figure 12:
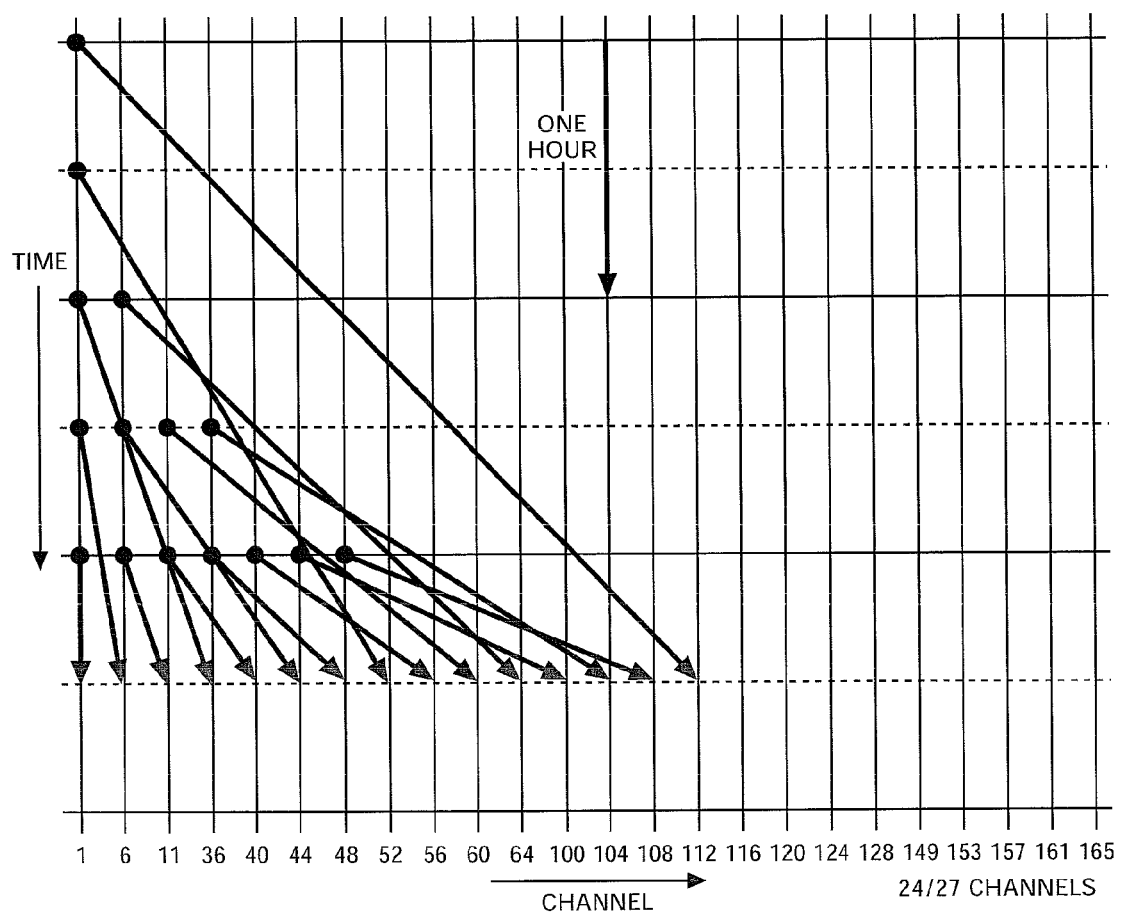
FIG. 12 shows a process of sending the distribution data via wireless communication in two hours and thirty minutes from the beginning.

FIG. 12 shows a process of sending the distribution data via wireless communication in two hours and thirty minutes from the beginning. The information processing units which have received the distribution data in two hours from the beginning and the source information processing unit send the distribution data to other information processing units through the channel 1, 6, 11, 36, 40, 44, 48, 52, 56, 60, 64, 100, 104, 108 and 112, respectively.

Figure 13:
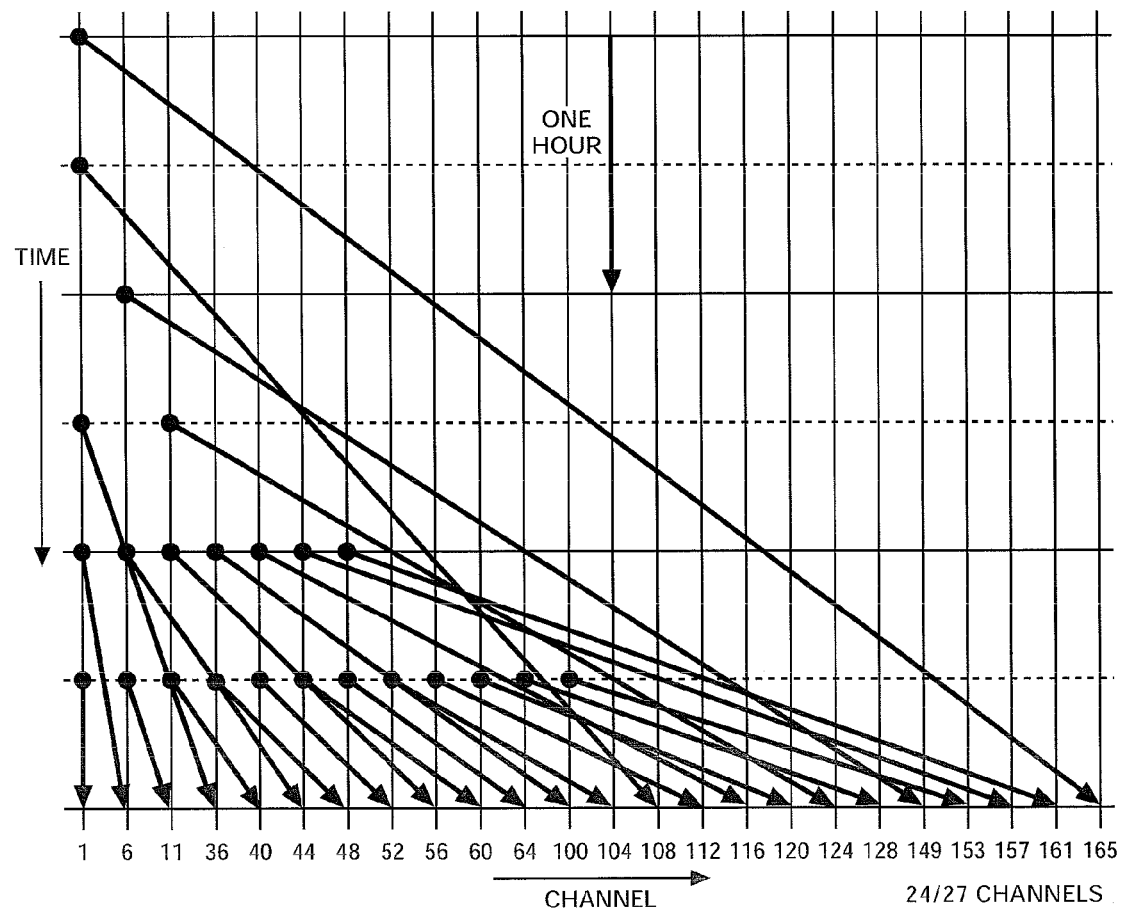
FIG. 13 shows a process of sending the distribution data via wireless communication in three hours from the beginning.
Figure 14:
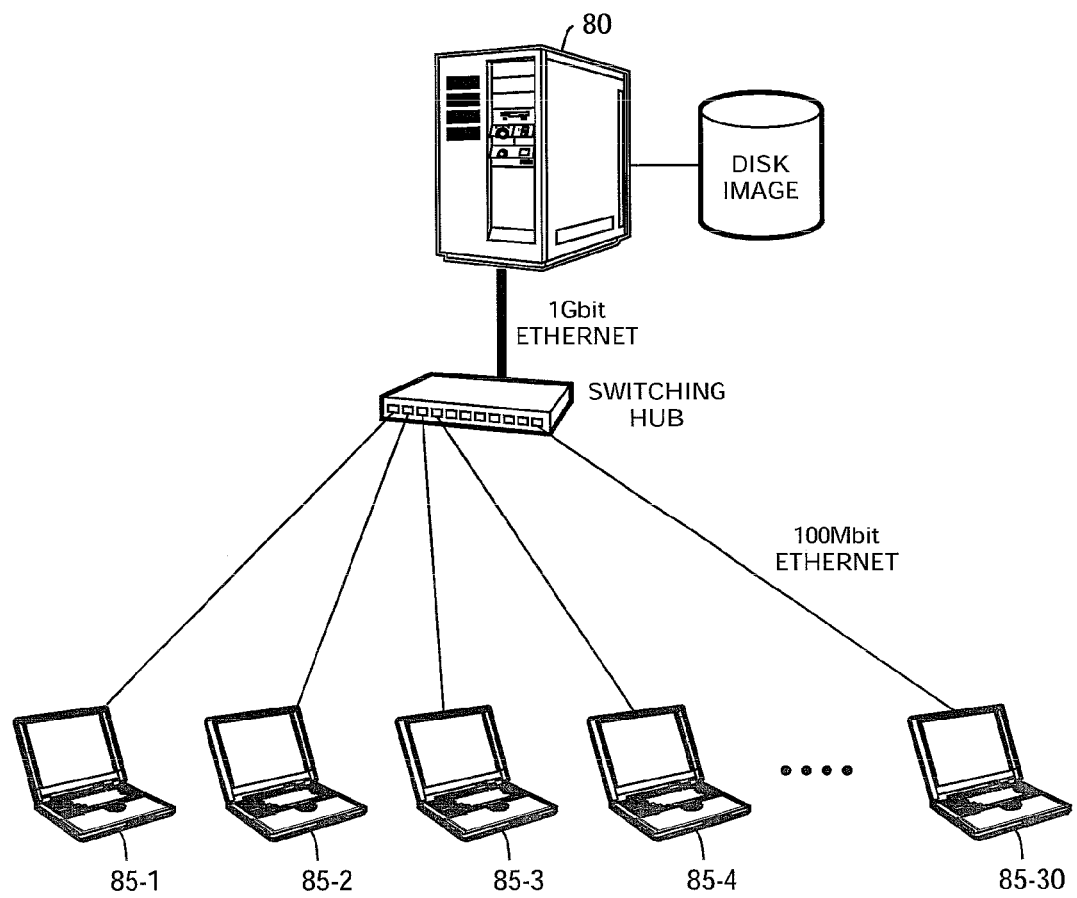
FIG. 14 is a conceptual diagram showing that a disk image is distributed via a wired network.
Figure 15:
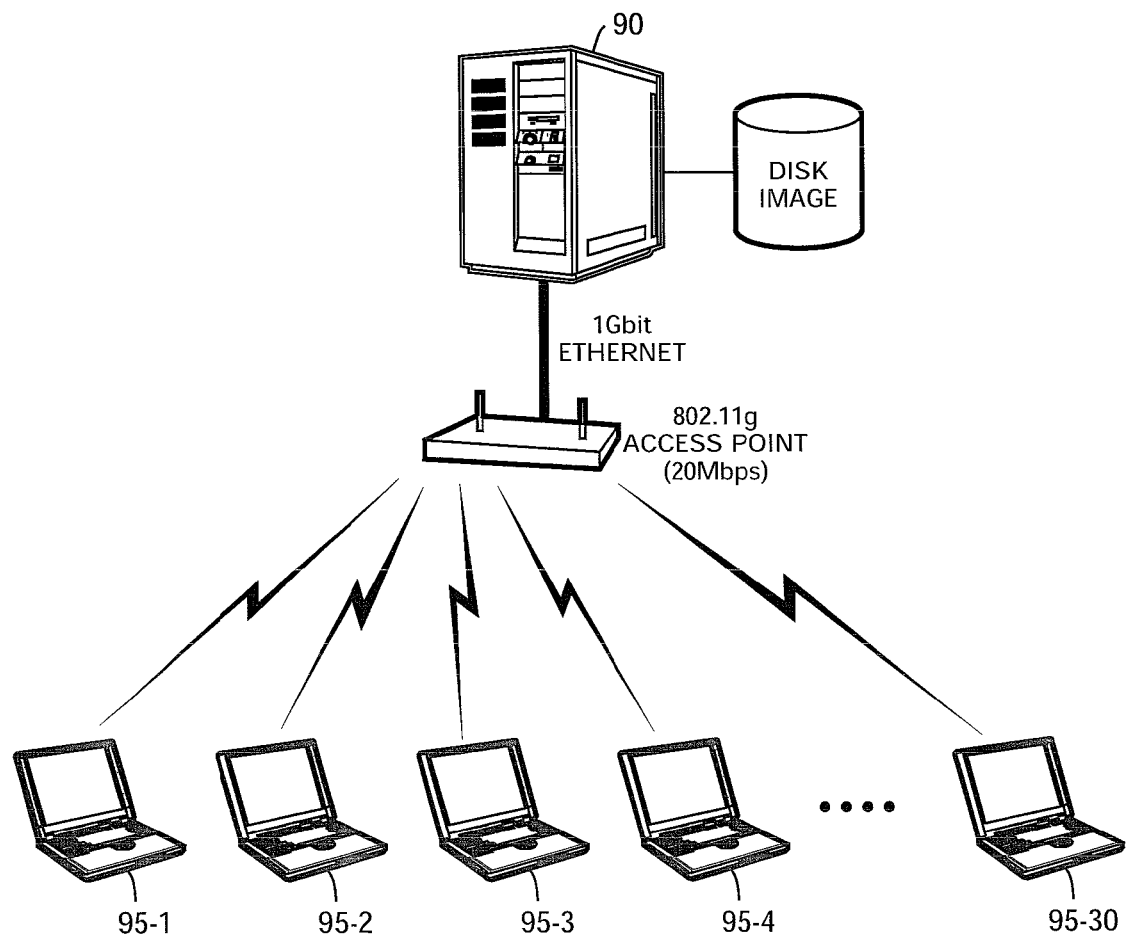
FIG. 15 is a conceptual diagram showing that a disk image is distributed via a wireless network.

FIG. 13 shows a process of sending the distribution data via wireless communication in three hours from the beginning. The information processing units which have received the distribution data in two hours and thirty minutes from the beginning and the source information processing unit send the distribution data to other information processing units through the channel 1, 6, 11, 36, 40, 44, 48, 52, 56, 60, 64, 100, 104, 108, 112, 116, 120, 124, 128, 149, 153, 157, 161 and 165, respectively. As a result, the distribution data is stored in fifty-three information processing units in three hours.

As described above, with the information processing system 10 according to this embodiment, it is possible to efficiently distribute data using a plurality of frequency bands at the same time even if each information processing unit can use only one frequency band. Thereby, in comparison with the case of using an expensive communication device using a plurality of frequency bands at the same time, the same level of communication speed can be achieved at a lower cost. Furthermore, even if it is legally prohibited for one device to a plurality of frequency bands at the same time, high-speed communication can be realized by efficiently utilizing a plurality of frequency bands.

Furthermore, according to the embodiment, it is possible to save battery consumption in consideration of use after distribution of distribution data. Thereby, it is possible to reduce burden on an administrator and general users and enhance convenience for them in various application fields such as school education, various lectures and company training.

While the present invention has been described with reference to presently preferred embodiments, the technical scope of the present invention is not limited to the embodiment described above. It is apparent to those skilled in the art that various modifications or improvements can be made to the embodiment described above. It is apparent from the appended claims that such modified or improved embodiments can also be included in the technical scope of the present invention.

What is claimed is:

1. An informnation processing system comprising a plurality of information processing units, each of said information processing units comprising:
   a distribution data receiving section configured to receive distribution data;
   a destination selection section configured to select a destination information processing unit from among said plurality of information processing units of the information processing system; and
   a distribution data sending section configured to send said distribution data to the destination information processing unit using a first frequency band that is not being used by other information processing units of the information processing system to transmit the distribution data,
   where sending occurs at least in part while a second wireless frequency band is used by at least one of the other information processing units to transmit the distribution data,
   where the distribution data sending section is further configured to detect a non-interfering frequency band that does not interfere with the second wireless frequency band being used by the at least one of the other information processing units that is located within a range, where the first wireless frequency band is the detected non-interfering frequency band.

2. A computer readable medium encoded with instructions capable of being executed by a computer to cause the computer to perform operations comprising:
   receiving distribution data;
   selecting a destination computer from among computers of an information processing system; and
   sending the distribution data to the destination computer using a first wireless frequency band that is not being used by other computers of the information processing system to transmit the distribution data,
   where sending occurs at least in part while a second wireless frequency band is used by at least one of the other computers to transmit the distribution data,
   where the operations further comprise detecting a non-interfering frequency band that does not interfere with the second wireless frequency band being used by an information processing unit of the information processing system that is located within a range, where the first wireless frequency band is the detected non-interfering frequency band.

3. A computer readable medium as in claim 2, where the operations further comprise temporarily suspending operation of said computer in response to not detecting any unused wireless frequency bands.

4. A computer readable medium as in claim 2, where the operations further comprise determining if there is sufficient power available to send the distribution data, and sending the distribution data occurs in response to a determination that sufficient power is available.

5. A computer readable medium as in claim 2, where selecting selects as the destination computer a computer having a highest communication speed.

6. An information processing unit comprising:
   a receiver configured to receive distribution data,
   where the distribution data is to be distributed to at least one other information processing unit in an information processing system;

a central processing unit configured to select a destination information processing unit from among the information processing units of the information processing system, and a transmitter configured to send said distribution data to the destination information processing unit using a first wireless frequency band that is not being used by other information processing units of the information processing system to transmit the distribution data, where sending occurs at least in part while a second wireless frequency band is used by at least one of the other information processing units to transmit the distribution data, where the central processing unit is further configured:

to detect a non-interfering frequency band that does not interfere with the second wireless frequency band being used by an information processing unit of the information processing system that is located within a range, where the first wireless frequency band is the detected non-interfering frequency band.

7. The information processing unit according to claim 6, where the central processing unit is configured to select another information processing unit of the information processing system that communicates with the information processing unit at a highest speed as the destination information processing unit.

8. The information processing unit according to claim 6, where the central processing unit is further configured:

to temporarily power down the information processing unit and to place the information processing unit in a suspended state if no non-interfering frequency bands are detected.

9. The information processing unit according to claim 6, where the central processing unit is further configured:

to inquire of at least one other information processing unit of the information processing system whether the distribution data has been received, where selecting selects an information processing unit from among information processing units that respond that the distribution data has not been received, to notify the destination information processing unit that the destination information processing unit has been selected as the destination information processing unit, and to notify at least one responding information processing unit that has not been selected as the destination information processing unit that the non-selected information processing unit has not been selected as the destination information processing unit.

10. The information processing unit according to claim 9, where the central processing unit is further configured:

in response to receiving an inquiry as to whether the information processing unit has received the distribution data, to determine whether the distribution data has already been received;

in response to determining that the distribution data has not been received, to respond that the distribution data has not been received and to place the information processing unit in a reserved state, where while in the reserved state additional responses indicating that the distribution data has not been received are not made in response to receiving additional inquiries;

in response to receiving a notification indicating that the information processing unit has been selected as the destination information processing unit, to receive the distribution data; and in response to receiving a notification indicating that the information processing unit has not been selected as the destination information processing unit, to release the reserved state.

11. The information processing unit according to claim 9, where the central processing unit is further configured:

to send, to each of the responding information processing units that have not been selected as the destination information processing unit, first information descriptive of a first total number of the responding information processing units; and in response to receiving second information descriptive of a second total number of the responding information processing units, to temporarily power down the information processing unit for a period of time that is related to the second total number of the responding information processing units.

12. The information processing unit according to claim 6, where the central processing unit is further configured to temporarily power down the information processing unit and to switch the information processing unit to a suspend state in response to not detecting any information processing units that have not received the distribution data.

13. The information processing unit according to claim 6 further comprising a power source, and where the central processing unit is further configured to power down the information processing unit without sending the distribution data in response to determining that the strength of the power source is below an amount required for sending the distribution data.

14. The information processing unit according to claim 6, further comprising a power source, and where the central processing unit is further configured to power down the information processing unit in response to determining that the strength of the power source is below an amount required for receiving the distribution data.

15. The information processing unit according to claim 6, where the central processing unit is further configured, in response to sending the distribution data at a first communication speed, to select a next destination information processing unit after a waiting time that is a function of a second communication speed of the next destination information processing unit.

16. The information processing unit according to claim 15, where the waiting time is further a function of a number of HOPs which indicate a number of times the distribution data has been transferred sequentially by information processing units.

17. The information processing unit according to claim 6, where the central processing unit is further configured to acquire a transfer route along which the distribution data is transferred sequentially by information processing units, where selecting the destination information processing unit is based on the transfer route.

18. The information processing unit according to claim 17, where the central processing unit is further configured:

to acquire used band indicating information specifying a frequency band to be used by each information processing unit for wireless communication; and to detect, based on the used band indicating information, a non-interfering band that is a frequency band that does not interfere with any radio waves of wireless communication performed by any information processing units located within a range.

* * * * *